US011539212B2

(12) United States Patent
Xu et al.

(10) Patent No.: US 11,539,212 B2
(45) Date of Patent: Dec. 27, 2022

(54) PHOTOVOLTAIC POWER GENERATION SYSTEM AND PHOTOVOLTAIC POWER TRANSMISSION METHOD

(71) Applicant: Huawei Digital Power Technologies Co., Ltd., Shenzhen (CN)

(72) Inventors: Fei Xu, Shenzhen (CN); Yongbing Gao, Shanghai (CN); Guoping Fan, Shenzhen (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 136 days.

(21) Appl. No.: 16/984,418

(22) Filed: Aug. 4, 2020

(65) Prior Publication Data

US 2020/0366236 A1 Nov. 19, 2020

Related U.S. Application Data

(63) Continuation of application No. PCT/CN2019/072778, filed on Jan. 23, 2019.

(30) Foreign Application Priority Data

Feb. 5, 2018 (CN) .......................... 201810114068.0

(51) Int. Cl.
*H02J 3/32* (2006.01)
*H02S 40/32* (2014.01)
(Continued)

(52) U.S. Cl.
CPC ................ *H02J 3/32* (2013.01); *H02J 3/381* (2013.01); *H02J 3/46* (2013.01); *H02M 3/158* (2013.01);
(Continued)

(58) Field of Classification Search
CPC ....... H02S 40/32; H02M 3/158; H02M 7/797; H02J 3/381; H02J 3/46; H02J 7/35;
(Continued)

(56) References Cited

U.S. PATENT DOCUMENTS 8,493,020 B2 7/2013 Lee et al.
9,041,354 B2 * 5/2015 Lee ........................... H02J 7/35
320/140
(Continued)

FOREIGN PATENT DOCUMENTS

CN 101286655 A 10/2008
CN 103199704 A 7/2013
(Continued)

OTHER PUBLICATIONS

Received STIC search report from EIC 2800 searcher Salim Alam for claim 1 dated Nov. 16, 2021. (Year: 2021).*
(Continued)

*Primary Examiner* — Emily P Pham
*Assistant Examiner* — Htet Z Kyaw
(74) *Attorney, Agent, or Firm* — Womble Bond Dickinson (US) LLP (57) ABSTRACT

This application provides a photovoltaic power generation system. The system includes at least one first photovoltaic module, a photovoltaic inverter, a first two-way DC/DC converter, and at least one first energy storage unit, and further includes at least one second photovoltaic module or at least one second energy storage unit. The photovoltaic inverter includes a DC/DC converter and a DC-AC inverter, where the DC/DC converter is electrically connected to the at least one first photovoltaic module, and the DC/DC converter is connected to the DC-AC inverter through a direct current bus. For the photovoltaic power generation system, photovoltaic arrays and energy storage devices can
(Continued)

be configured flexibly to cope with peaks and troughs of power consumption.

8 Claims, 4 Drawing Sheets

(51) Int. Cl.
    *H02M 3/158*     (2006.01)
    *H02M 7/797*     (2006.01)
    *H02J 3/46*     (2006.01)
    *H02J 3/38*     (2006.01)

(52) U.S. Cl.
    CPC ............ *H02M 7/797* (2013.01); *H02S 40/32* (2014.12); *H02J 2300/26* (2020.01)

(58) Field of Classification Search
    CPC .......... H02J 2300/26; H02J 3/32; H02J 3/383; Y02E 10/56; Y02E 70/30
    USPC ........................................................ 323/221
    See application file for complete search history.

(56) References Cited

U.S. PATENT DOCUMENTS

| | | | |
|---|---|---|---|
| 9,397,504 B1* | 7/2016 | Narla | H02S 40/38 |
| 9,537,319 B2* | 1/2017 | Parkhideh | H02J 3/38 |
| 9,583,939 B2* | 2/2017 | Shenoy | H02J 3/381 |
| 9,912,150 B2* | 3/2018 | Izumi | H02J 3/381 |
| 9,941,702 B2* | 4/2018 | Abido | H02J 3/28 |
| 9,977,452 B2* | 5/2018 | Abu Qahouq | H01L 31/02021 |
| 10,014,717 B2* | 7/2018 | Wang | H02J 9/061 |
| 10,164,436 B2* | 12/2018 | Takenaka | H02J 3/383 |
| 10,263,456 B1* | 4/2019 | Wang | H02J 9/06 |
| 10,355,611 B2* | 7/2019 | Nagashima | B60L 53/53 |
| 10,381,930 B2* | 8/2019 | Albert | H02J 7/35 |
| 10,447,070 B2* | 10/2019 | Qin | H02J 7/35 |
| 10,857,897 B2* | 12/2020 | Narla | B60L 53/20 |
| 10,951,038 B2* | 3/2021 | Sugeno | H02J 3/383 |
| 11,043,902 B2* | 6/2021 | Krzywinski | H02M 3/33584 |
| 2011/0215640 A1* | 9/2011 | Donnelly | H02J 3/466 307/21 |
| 2013/0307479 A1* | 11/2013 | Kim | H02J 7/007 320/155 |
| 2014/0042815 A1* | 2/2014 | Maksimovic | H02J 1/102 307/63 |
| 2015/0229268 A1* | 8/2015 | Satake | H01L 31/02021 136/244 |
| 2016/0064985 A1* | 3/2016 | Tao | H02J 3/381 320/101 |
| 2017/0070081 A1* | 3/2017 | Cher | H02J 3/385 |
| 2017/0187189 A1* | 6/2017 | Abido | H02J 3/385 |
| 2017/0331293 A1* | 11/2017 | Narla | H02J 3/381 |
| 2018/0048160 A1* | 2/2018 | Narla | H02J 3/46 |
| 2018/0241243 A1 | 8/2018 | Zhu et al. | |
| 2019/0135116 A1* | 5/2019 | Narla | B60L 55/00 |

FOREIGN PATENT DOCUMENTS

| | | |
|---|---|---|
| CN | 103532214 A | 1/2014 |
| CN | 204089686 U | 1/2015 |
| CN | 104467017 A | 3/2015 |
| CN | 104518672 A | 4/2015 |
| CN | 105071438 A | 11/2015 |
| CN | 105244899 A | 1/2016 |
| CN | 105391301 A | 3/2016 |
| CN | 205385293 U | 7/2016 |
| CN | 106026646 A | 10/2016 |
| CN | 104319798 B | 11/2016 |
| CN | 106165241 A | 11/2016 |
| CN | 106451544 A | 2/2017 |
| CN | 104185936 B | 5/2017 |
| CN | 106712156 A | 5/2017 |
| CN | 106787707 A | 5/2017 |
| CN | 104882906 B | 6/2017 |
| CN | 104410099 B | 7/2017 |
| CN | 107565677 A | 1/2018 |
| CN | 108233421 A | 6/2018 |
| JP | 2017143633 A | 8/2017 |
| WO | 2016170184 A1 | 10/2016 |

OTHER PUBLICATIONS

Received STIC search report from EIC 2800 searcher Salim Alam for claim 6 dated Nov. 17, 2021. (Year: 2021).*
Received STIC search report from EIC 2800 searcher Salim Alam for claim 8 dated Nov. 18, 2021. (Year: 2021).*
Attached translated version of foreign patent JP2017143633 A. (Year: 2017).*
Attached translated version of foreign patent CN 106026646 A. (Year: 2016).*
Attached translated version of foreign patent CN103199704 B. (Year: 2015).*
Attached translated version of foreign patent CN204089686 U. (Year: 2015).*
Xuezheng Zhang,"Research on a Three-Port Converter for Photovoltaic and Storage Generation",Harbin Institute of Technology,dated Dec. 2015,total 67 pages.
Haifeng Yang,"Study on the Multi-port Bidirectional DC-DC Converter for Alone Solar Fuel Cell Hybrid Generation System",dated May 2009,total 71 pages.
Hongfei Wu et al.,"A Family of Multiport Buck Boost Converters Based on DC-Link-Inductors (DLIs)",IEEE Transactions on Power Electronics, vol. 30, No. 2, Feb. 2015,total 12 pages.
Liwei Tao,"Design of a Multi-port PV DC/DC Converter Based on Combined Pulse Unit",Nanjing University of ScienceandTechnology,dated Mar. 2015,total 109 pages.

* cited by examiner

PHOTOVOLTAIC POWER GENERATION SYSTEM AND PHOTOVOLTAIC POWER TRANSMISSION METHOD

CROSS-REFERENCE TO RELATED APPLICATIONS

This application is a continuation of International Application No. PCT/CN2019/072778, filed on Jan. 23, 2019, which claims priority to Chinese Patent Application 201810114068.0, filed on Feb. 5, 2018, The disclosures of the aforementioned applications are hereby incorporated by reference in their entireties.

TECHNICAL FIELD

This application relates to the field of electrical circuits, and in particular, to a photovoltaic power generation system and a photovoltaic power transmission method.

BACKGROUND

Photovoltaic power generation is a clean technology that directly converts light energy into electrical energy by using a photovoltaic effect of a semiconductor interface. This technology is characterized by, for example, cleanliness, sustainability and safety. Disadvantages of photovoltaic power generation are an unpredictable output power and wide fluctuation of the output power, which bring a series of problems to stability of a power grid.

One way to solve the foregoing problems is to add an energy storage device to a photovoltaic power generation system. When an output power of a photovoltaic array is relatively high and an amount of power demanded by a power grid is relatively small, excess electrical energy may be stored in the energy storage device. When the output power of the photovoltaic array is relatively low and the amount of power demanded by the power grid is relatively large, the electrical energy stored in the energy storage device may be transferred to the power grid, thereby improving stability of the power grid.

In the photovoltaic power generation system with the energy storage device added, the photovoltaic array is connected to the power grid through a photovoltaic inverter, the energy storage device is connected to the power grid through a direct current-direct current (DC/DC) converter, and the energy storage device is connected to the photovoltaic array through the DC/DC converter to store the excess electrical energy output by the photovoltaic array.

Because powers of the photovoltaic inverter and the DC/DC converter are both subject to maximum power limits, when the output power of the photovoltaic array needs to be increased, a higher-power photovoltaic inverter is required; and when a smaller amount of power is demanded by the power grid, a larger-capacity storage device is required to store electrical energy. Accordingly, a higher-power DC/DC converter is required. As a result, it is impossible to configure photovoltaic arrays and energy storage devices flexibly for the photovoltaic power generation system.

SUMMARY

This application provides a photovoltaic power generation system that uses a DC/DC converter including at least three ports to connect an energy storage unit and a photovoltaic inverter, so as to improve flexibility of photovoltaic array and energy storage device configuration for the photovoltaic power generation system, and reduce costs of reengineering the photovoltaic power generation system.

According to a first aspect, a photovoltaic power generation system is provided, including at least one first photovoltaic module, a photovoltaic inverter, a first two-way DC/DC converter, and at least one first energy storage unit, and further including at least one second photovoltaic module or at least one second energy storage unit. The photovoltaic inverter includes a DC/DC converter and a direct current-alternating current (DC-AC) inverter, where an input terminal of the DC/DC converter is electrically connected to an output terminal of the at least one first photovoltaic module, an output terminal of the DC/DC converter is connected to an input terminal of the DC-AC inverter through a direct current bus, and the photovoltaic inverter is configured to convert a direct current output by the first photovoltaic module into an alternating current and output the alternating current to a power grid. The first two-way DC/DC converter includes at least three ports, where a first port of the at least three ports of the first two-way DC/DC converter is electrically connected to the direct current bus, a second port of the at least three ports of the first two-way DC/DC converter is electrically connected to a port of the at least one first energy storage unit, a third port of the at least three ports of the first two-way DC/DC converter is electrically connected to an output terminal of the at least one second photovoltaic module or a port of the at least one second energy storage unit, and a circuit between any two ports of the first, second, and third ports of the first two-way DC/DC converter is configured as a circuit with two-way circulation.

In the photovoltaic power generation system provided in this embodiment, the at least one first photovoltaic module provides daily power supply to the power grid, and the at least one first energy storage unit is configured to ensure stability of daily power supply. When a power consumption peak comes, power generated by a photovoltaic array needs to be increased. To do this, the at least one second photovoltaic module may be connected to the third port of the first two-way DC/DC converter, to increase an output power of the photovoltaic array. When a power consumption trough comes, the at least one second energy storage unit may be connected to the third port of the first two-way converter to store excess electrical energy. In this way, photovoltaic arrays and energy storage devices can be configured flexibly to cope with peaks and troughs of power consumption. In addition, because there is no need to replace the DC/DC converter in the photovoltaic inverter with a higher-power DC/DC converter, costs of reengineering the photovoltaic power grid are reduced.

In one embodiment, the photovoltaic power generation system further includes a second two-way DC/DC converter, at least one third energy storage unit, and at least one third photovoltaic module or at least one fourth energy storage unit. The second two-way DC/DC converter includes at least three ports, where a first port of the at least three ports of the second two-way DC/DC converter is electrically connected to the direct current bus of the photovoltaic inverter, a second port of the at least three ports of the second two-way DC/DC converter is electrically connected to a port of the at least one third energy storage unit, and a third port of the at least three ports of the second two-way DC/DC converter is electrically connected to an output terminal of the at least one third photovoltaic module or a port of the at least one fourth energy storage unit.

If a power of the first two-way DC/DC converter fails to meet a power demand of the power grid or an energy storage demand of the at least one photovoltaic module, the second two-way DC/DC converter may be connected to the photovoltaic inverter, without changing an existing architecture of the photovoltaic power generation system. In this way, photovoltaic arrays and energy storage devices can be configured more flexibly to cope with the peaks and troughs of power consumption, and reduce the costs for reengineering the photovoltaic power grid.

In one embodiment, the circuit between the first port and the second port of the first two-way DC/DC converter is configured as a booster circuit, where the first port is a high-level port and the second port is a low-level port; the circuit between the first port and the third port of the first two-way DC/DC converter is configured as a booster circuit, where the first port is a high-level port and the third port is a low-level port; and the circuit between the second port and the third port of the first two-way DC/DC converter is configured as a buck-boost circuit.

Because voltages input to the second and third port of the first two-way DC/DC converter are typically low, an input voltage required by the DC/AC inverter in the photovoltaic inverter cannot be fulfilled. Therefore, the circuit between the first port and the second port may be configured as a booster circuit, and the circuit between the first port and the third port may be configured as a booster circuit, without using any other booster devices. In this way, costs for constructing and reengineering the photovoltaic power generation system are reduced. In addition, the circuit between the second port and the third port is configured as a buck-boost circuit, meeting input voltage requirements of different types of first energy storage units.

In one embodiment, the second port of the first two-way DC/DC converter includes at least two sub-ports that are electrically connected to output terminals of at least two second photovoltaic modules, and the at least two sub-ports are in a one-to-one correspondence with the at least two second photovoltaic modules.

In one embodiment, the photovoltaic power generation system further includes a maximum power point tracking (MPPT) controller, where the MTTP controller is configured to control a current direction in the first two-way DC/DC converter and a charge/discharge power of the first two-way DC/DC converter.

According to a second aspect, a photovoltaic power transmission method is provided, which is applied to the photovoltaic power generation system in the first aspect, where the second port of the first two-way DC/DC converter is electrically connected to the output terminal of the at least one second photovoltaic module. The method includes:

when an amount of power demanded by the power grid is less than an amount of power generated by the at least one first photovoltaic module, configuring, by the MPPT controller, the current direction of the first two-way DC/DC converter to be from the first port to the second port and from the third port to the second port; or when an amount of power demanded by the power grid equals an amount of power generated by the at least one first photovoltaic module, configuring, by the MPPT controller, the current direction of the first two-way DC/DC converter to be from the third port to the second port; or when an amount of power demanded by the power grid is greater than an amount of power generated by the at least one first photovoltaic module, configuring, by the MPPT controller, the current direction of the first two-way DC/DC converter to be from the third port to the first port and/or from the second port to the first port.

According to the photovoltaic power generation method provided in this embodiment, when a power consumption peak comes, the MPPT controller configures the circuit of the first two-way DC/DC converter, so that the at least one first photovoltaic module, the at least one second photovoltaic module, and the first energy storage unit supply power to the power grid simultaneously; and when a power consumption trough comes, the MPPT controller configures the circuit of the first two-way DC/DC converter, so that the first energy storage unit stores excess electrical energy generated by the at least one first photovoltaic module and the at least one second photovoltaic module. In this way, stability of power supply is ensured.

In one embodiment, when the amount of power demanded by the power grid is greater than the amount of power generated by the at least one first photovoltaic module, the MPPT controller configures the current direction of the first two-way DC/DC converter to be from the third port to the first port and/or from the second port to the first port. This includes:

when the amount of power demanded by the power grid is greater than the amount of power generated by the at least one first photovoltaic module, and less than an amount of power generated by the at least one first photovoltaic module and the at least one second photovoltaic module, configuring, by the MPPT controller, the current direction of the first two-way DC/DC converter to be from the third port to the first port and from the third port to the second port; or when the amount of power demanded by the power grid equals an amount of power generated by the at least one first photovoltaic module and the at least one second photovoltaic module, configuring, by the MPPT controller, the current direction of the first two-way DC/DC converter to be from the third port to the first port; or when the amount of power demanded by the power grid is greater than an amount of power generated by the at least one first photovoltaic module and the at least one second photovoltaic module, configuring, by the MPPT controller, the current direction of the first two-way DC/DC converter to be from the third port to the first port and from the second port to the first port.

According to the solution provided in this embodiment, when the amount of power demanded by the power grid is greater than the amount of power generated by the at least one first photovoltaic module, the MPPT controller controls the first two-way DC/DC converter to preferentially transmit the power generated by the at least one second photovoltaic module to the power grid. In this way, charge/discharge times of the first energy storage unit are reduced and a service life of the first energy storage unit is extended.

According to a third aspect, another photovoltaic power transmission method is provided, which is applied to the photovoltaic power generation system in the first aspect, where the second port of the first two-way DC/DC converter is electrically connected to the port of the at least one second energy storage unit. The method includes:

when an amount of power demanded by the power grid is less than an amount of power generated by the at least one first photovoltaic module, configuring, by the MPPT controller, the current direction of the first two-way DC/DC converter to be from the first port to the second port and/or from the first port to the third port; or when an amount of power demanded by the power grid is greater than an amount of power generated by the at least one first photovoltaic module, configuring, by the MPPT controller, the current direction of the first two-way DC/DC converter to be from the second port to the first port and/or from the third port to the first port.

According to the solution provided in this embodiment, when the amount of power demanded by the power grid is less than or equals the amount of power generated by the at least one first photovoltaic module, the MPPT controller forbids the first two-way DC/DC converter from transmitting energy stored in the at least one first energy storage unit and the at least one second energy storage unit to the power grid. In this way, charge/discharge times of the first energy storage unit and the second energy storage unit can be reduced, and service lives of the first energy storage unit and the second energy storage unit can be extended.

DESCRIPTION OF EMBODIMENTS

The following describes technical solutions of this application with reference to the accompanying drawings.

Figure 1:
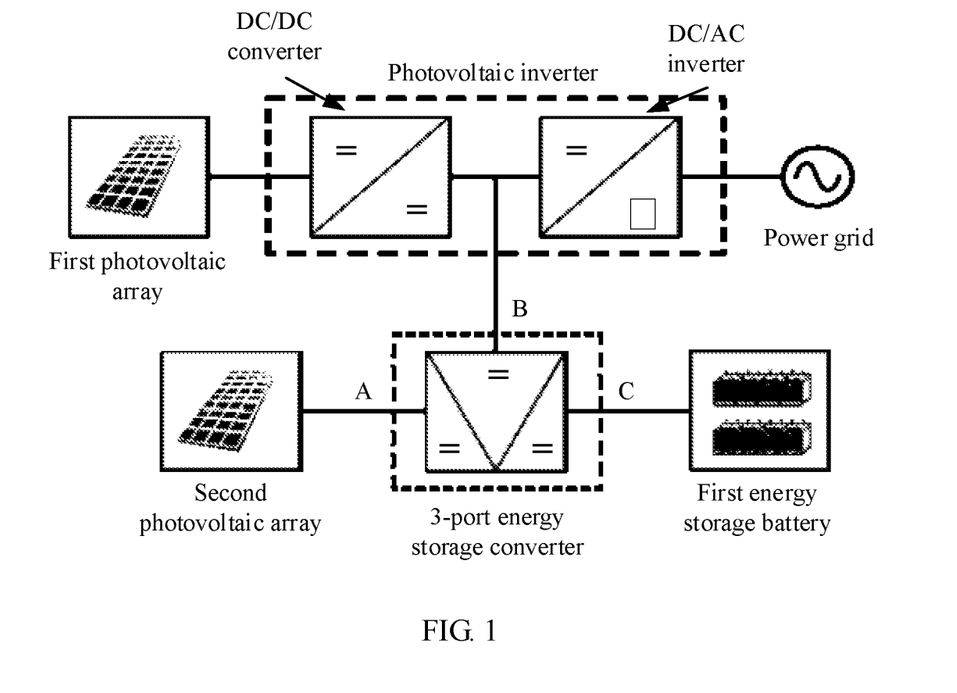
FIG. 1 is a schematic architectural diagram of a photovoltaic power generation system according to an embodiment of this application.

FIG. 1 is a schematic architectural diagram of a photovoltaic power generation system according to an embodiment of this application.

As shown in FIG. 1, a first photovoltaic array includes at least one first photovoltaic module; a photovoltaic inverter is a cluster inverter formed by a DC/DC converter and a DC/AC inverter connected in series through a direct current bus; and of a 3-port energy storage converter, a port B is connected to the direct current bus, and the other two ports are connected respectively to a second photovoltaic array and a first energy storage battery. The second photovoltaic array includes at least one second photovoltaic module, and the first energy storage battery includes at least one first energy storage unit.

A direct current generated by the first photovoltaic array is converted to an alternating current and the alternating current is transmitted to a power grid, by the photovoltaic inverter. The DC/DC converter in the photovoltaic inverter is configured to adjust a voltage of the direct current, so that an output voltage of the first photovoltaic array meets an input voltage of the DC/AC inverter. Alternatively, the direct current generated by the first photovoltaic array may be transmitted to the first energy storage battery through the 3-port energy storage converter.

A direct current generated by the second photovoltaic array is transmitted to the power grid through the 3-port energy storage converter and the DC/AC inverter in the photovoltaic inverter. Alternatively, the direct current generated by the second photovoltaic array may be transmitted to the first energy storage battery through the 3-port energy storage converter.

Because electrical energy generated by the first photovoltaic array and the second photovoltaic array can be stored in the first energy storage battery through the 3-port energy storage converter, and electrical energy stored in the first energy storage battery can be transmitted to the power grid through the 3-port energy storage converter, the 3-port energy storage converter may also be referred to as a two-way DC/DC converter.

When a power consumption peak comes, a charge/discharge controller may break a circuit between the port B and a port C and a circuit between a port A and the port C, of the 3-port energy storage converter, so that the electrical energy generated by the first photovoltaic array and the second photovoltaic array is transmitted to the power grid, instead of being stored in the first energy storage battery. If a power demand keeps rising, the charge/discharge controller may close the circuit between the port B and the port C to release the electrical energy stored in the first energy storage battery, thereby meeting the power demand.

When a power consumption trough comes, the charge/discharge controller may control a current direction of the 3-port energy storage converter to be from the port B to the port C and from the port A to the port C, and store excess electrical energy generated by the first photovoltaic array and the second photovoltaic array in the first energy storage battery, to avoid impact of the excess electrical energy on the power grid. If the power demand keeps dropping, the port A may be disconnected from the second photovoltaic array, and a second energy storage battery may be connected to the 3-port energy storage converter through the port A, to further reduce power generation and store the excess electrical energy. A photovoltaic power generation architecture with the port A connected to the second energy storage battery is shown in FIG. 2 according to an embodiment.

The 3-port energy storage converter is only an example of description. The first two-way DC/DC converter provided in this application may further include more ports, for example, being a 4-port two-way DC/DC converter or a 5-port two-way DC/DC converter. An additional port of the two-way DC/DC converter may be connected to a photovoltaic array or an energy storage battery. In this way, photovoltaic arrays and energy storage batteries can be configured more flexibly.

Figure 2:
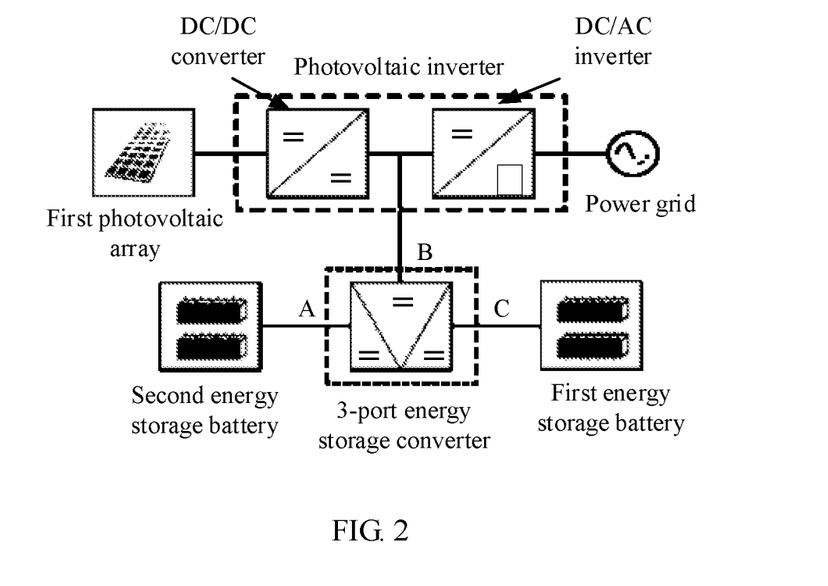
FIG. 2 is a schematic architectural diagram of another photovoltaic power generation system according to an embodiment of this application.

In the photovoltaic power generation system embodiments shown in FIG. 1 or FIG. 2, the first photovoltaic array is typically a high-power photovoltaic array, and the second photovoltaic array is typically a low-power photovoltaic array. Accordingly, a rated power of the DC/DC converter in the photovoltaic inverter is typically higher than that of the 3-port energy storage converter; and for the DC/DC converter or the 3-port energy storage converter, increase of the rated power is not proportional to increase of costs. For example, costs for increasing a rated power of a DC/DC converter from 100 kilowatts (kW) to 120 kW are much higher than those for increasing a rated power of a 3-port energy storage converter from 20 kW to 40 kW. Therefore, when an existing photovoltaic power generation system is reengineered in accordance with the photovoltaic power generation system provided in this application, it is unnecessary to replace a DC/DC converter in a photovoltaic inverter, but only a DC/DC converter connected to a first energy storage battery needs to be replaced. In this way, costs for reengineering a photovoltaic power grid are reduced. When the port A is connected to the second energy storage battery, the first energy storage battery and the second energy storage battery are not connected in parallel. This can avoid generation of a circulating current between batteries in parallel and improve available capacities and service lives of the first energy storage battery and the second energy storage battery.

Figure 3:
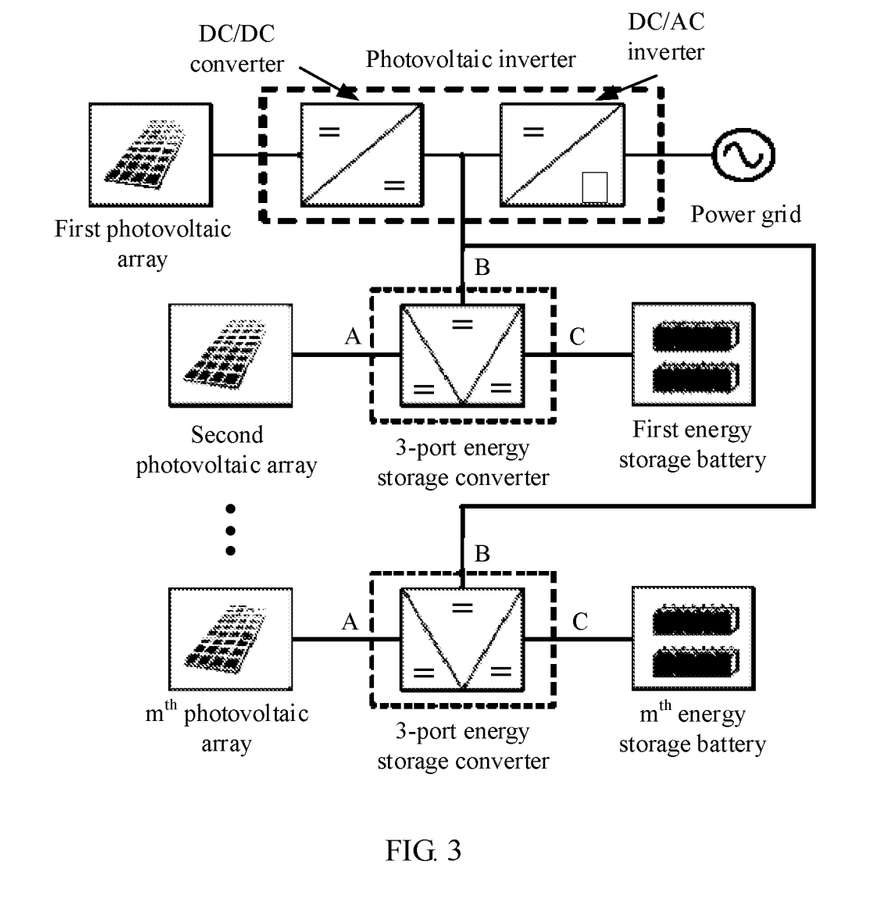
FIG. 3 is a schematic architectural diagram of still another photovoltaic power generation system according to an embodiment of this application.

FIG. 3 is a schematic architectural diagram of still another photovoltaic power generation system according to an embodiment of this application.

As shown in FIG. 3, a plurality of 3-port energy storage converters are connected to a direct current bus of a photovoltaic inverter, and a port A and a port C of each 3-port energy storage converter may be connected to one photovoltaic array and one energy storage battery respectively, or each connected to one photovoltaic array or one energy storage battery. In this way, photovoltaic arrays and energy storage devices can be configured more flexibly to cope with peaks and troughs of power consumption.

In general, two low-power 3-port energy storage converters cost less than one high-power 3-port energy storage converter. For example, two 20 kW 3-port energy storage converters cost less than one 40 kW 3-port energy storage converter. Therefore, with the photovoltaic power generation system shown in FIG. 3, construction and reengineering costs of a photovoltaic power grid can be reduced.

Figure 4:
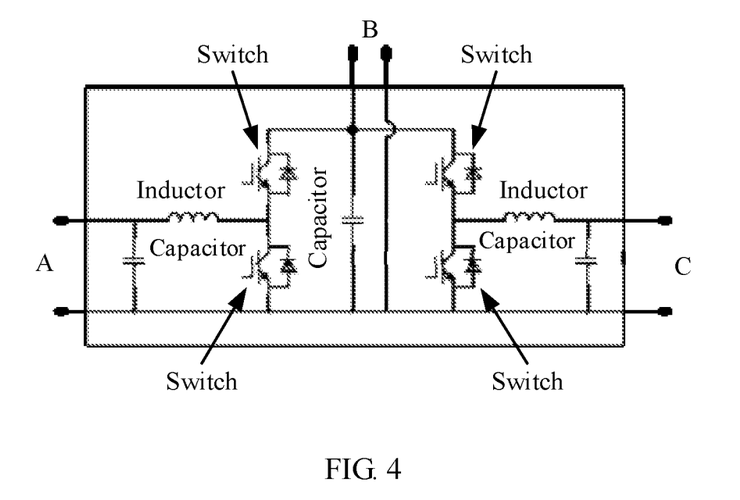
FIG. 4 is a schematic diagram of a circuit topology of a 3-port energy storage converter according to an embodiment of this application.

FIG. 4 is a schematic diagram of a circuit topology of a 3-port energy storage converter according to an embodiment of this application.

As shown in FIG. 4, from a port A to a port B is a booster circuit, from a port C to the port B is a booster circuit, and from the port A to the port C is a buck-boost circuit. The port B is configured to connect to a direct current bus of a photovoltaic inverter. The port C is configured to connect to an energy storage battery. The circuit between the port A and the port C is a circuit with two-way circulation. That is, a current may flow from the port A to the port B, or from the port B to the port A. When the port A is connected to a photovoltaic array, the circuit from the port A to the port B is a one-way circuit from the port A to the port B, and the circuit from the port A to the port C is a circuit with two-way circulation. When the port A is connected to an energy storage battery, the circuit from the port A to the port B is a circuit with two-way circulation, and the circuit from the port A to the port C may be a circuit with two-way circulation, a circuit with one-way circulation, or an open circuit. A circuit direction of the 3-port energy storage converter may be controlled by using a switch. A switch shown in FIG. 4 is, for example, an insulated gate bipolar transistor (insulated gate bipolar transistor, IGBT).

The port A of the 3-port energy storage converter in the foregoing photovoltaic power generation system may be a port including at least two sub-ports, with each sub-port connected to at least one photovoltaic module. The at least two sub-ports are independent of each other. The photovoltaic modules connected to the sub-ports are all connected to a same two-way DC/DC converter, allowing a charge/discharge controller (MPPT controller, for example) to control a charge/discharge power of the photovoltaic power generation system in a centralized manner. In this way, the charge power and the discharge power of the photovoltaic power generation system can be controlled more precisely.

In this embodiment, the MPPT controller may be a standalone device, or a device or module integrated into the 3-port energy storage converter. This application does not limit a specific form of the MPPT controller.

Figure 5:
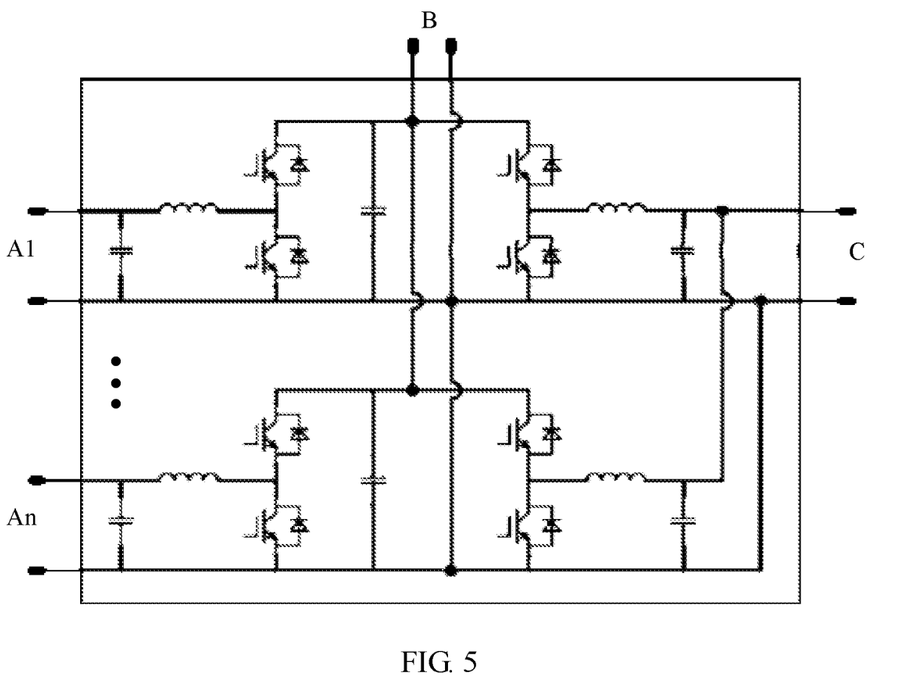
FIG. 5 is a schematic diagram of a circuit topology of another 3-port energy storage converter according to an embodiment of this application.
Figure 6:
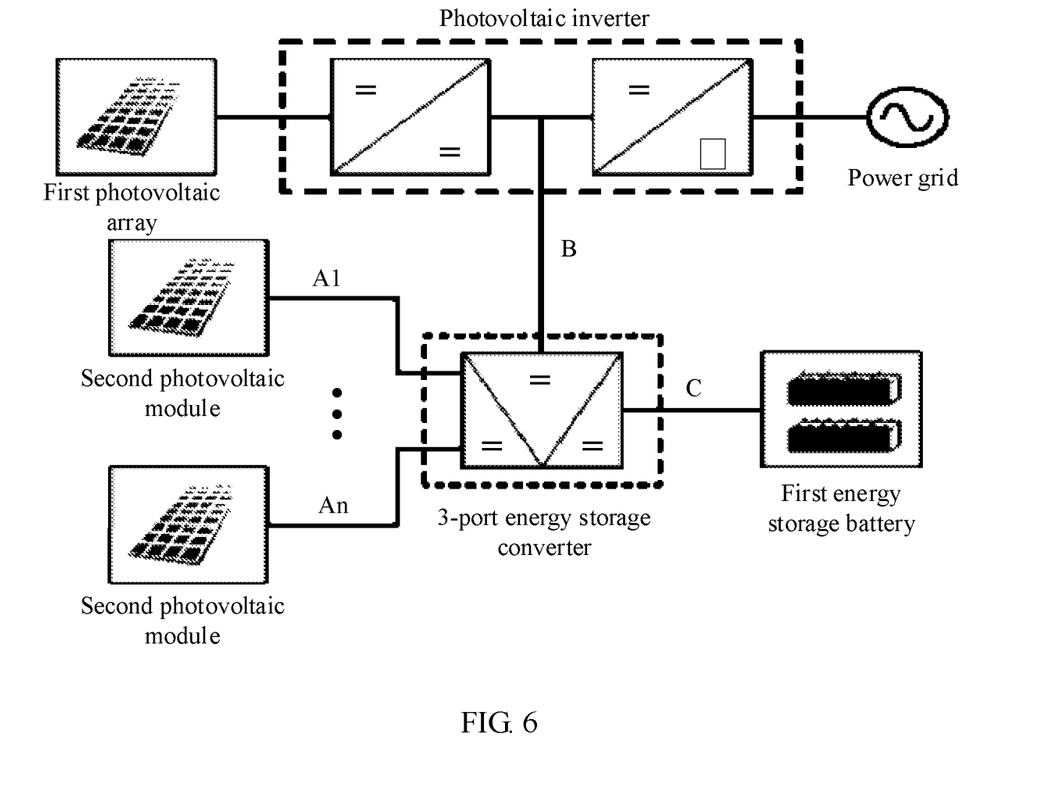
FIG. 6 is a schematic architectural diagram of yet another photovoltaic power generation system according to an embodiment of this application.

FIG. 5 is a schematic diagram of a circuit topology of the foregoing 3-port energy storage converter including at least two sub-ports according to an embodiment. FIG. 6 shows a photovoltaic power generation system including the 3-port energy storage converter shown in FIG. 5.

In the circuitry shown in FIG. 5, A1 to An are sub-ports independent of each other and are all sub-ports of the port A. A circuit from any one sub-port among A1 to An to the port B is configured as a booster circuit, a circuit from any one sub-port among A1 to An to the port C is configured as a buck-boost circuit, and a circuit from the port C to the port B is configured as a booster circuit. The MPPT controller controls current directions in circuits between the ports.

In the photovoltaic power generation system shown in FIG. 6, an input terminal of a photovoltaic inverter is electrically connected to an output terminal of a first photovoltaic array. The first photovoltaic inverter includes at least one first photovoltaic module. The sub-ports of the port A of the 3-port energy storage converter (namely, the first two-way DC/DC converter) are all electrically connected to an output terminal of a second photovoltaic module, and the port C of the 3-port energy storage converter is electrically connected to a port of a first energy storage battery. The first energy storage battery includes at least one energy storage unit.

Based on the photovoltaic power generation system shown in FIG. 1, FIG. 3, and FIG. 6, an embodiment of this application discloses a photovoltaic power transmission method 100. The method 100 includes:

Operation S110. When an amount of power demanded by the power grid is less than an amount of power generated by the at least one first photovoltaic module, the MPPT controller configures the current direction of the 3-port energy storage converter to be from the port B to the port C and from the port A to the port C; or Operation S120. When an amount of power demanded by the power grid equals an amount of power generated by the at least one first photovoltaic module, the MPPT controller configures the current direction of the 3-port energy storage converter to be from the port A to the port C; or Operation S130. When an amount of power demanded by the power grid is greater than an amount of power generated by the at least one first photovoltaic module, the MPPT controller configures the current direction of the 3-port energy storage converter to be from the port A to the port B and/or from the port C to the port B.

According to the photovoltaic power generation method provided in this embodiment, when a power consumption peak comes, the MPPT controller configures the circuit of the 3-port energy storage converter, so that the at least one first photovoltaic module, the at least one second photovoltaic module, and the first energy storage unit supply power to the power grid simultaneously; and when a power consumption trough comes, the MPPT controller configures the circuit of the 3-port energy storage converter, so that the first energy storage unit stores excess electrical energy generated by the at least one first photovoltaic module and the at least one second photovoltaic module. In this way, stability of power supply is ensured.

In one embodiment, operation S130 includes:

Operation S131. When the amount of power demanded by the power grid is greater than the amount of power generated by the at least one first photovoltaic module, and less than an amount of power generated by the at least one first photovoltaic module and the at least one second photovoltaic module, the MPPT controller configures the current direction of the 3-port energy storage converter to be from the port A to the port B and from the port A to the port C; or, Operation S132. When the amount of power demanded by the power grid equals an amount of power generated by the at least one first photovoltaic module and the at least one second photovoltaic module, the MPPT controller configures the current direction of the 3-port energy storage converter to be from the port A to the port B; or Operation S133. When the amount of power demanded by the power grid is greater than an amount of power generated by the at least one first photovoltaic module and the at least one second photovoltaic module, the MPPT controller configures the current direction of the 3-port energy storage converter to be from the port A to the port B and from the port C to the port B.

According to the solution provided by the method 100, when the amount of power demanded by the power grid is greater than the amount of power generated by the at least one first photovoltaic module, the MPPT controller controls the 3-port energy storage converter, to preferentially transmit the power generated by the at least one second photovoltaic module to the power grid. In this way, charge/discharge times of the first energy storage unit are reduced and a service life of the first energy storage unit is extended. It should be understood that when the method 100 is applied to the photovoltaic power generation system shown in FIG. 6, the port A in the method 100 may be one or more of the ports of A1 to An.

Based on the photovoltaic power generation system embodiment shown in FIG. 2, an embodiment of this application discloses another photovoltaic power transmission method 200. The method 200 includes:

Operation S210. When an amount of power demanded by the power grid is less than an amount of power generated by the at least one first photovoltaic module, the MPPT controller configures the current direction of the 3-port energy storage converter to be from the port B to the port C and/or from the port B to the port A; or Operation S220. When an amount of power demanded by the power grid is greater than an amount of power generated by the at least one first photovoltaic module, the MPPT controller configures the current direction of the 3-port energy storage converter to be from the port C to the port B and/or from the port A to the port B.

According to the solution provided by the method 200, when the amount of power demanded by the power grid is less than or equals the amount of power generated by the at least one first photovoltaic module, the MPPT controller forbids the 3-port energy storage converter from transmitting energy stored in the at least one first energy storage unit and the at least one second energy storage unit to the power grid. In this way, charge/discharge times of the first energy storage unit and the second energy storage unit are reduced, and service lives of the first energy storage unit and the second energy storage unit are extended.

The objectives, technical solutions, and beneficial effects of this application are further described in detail in the foregoing specific implementations. It should be understood that the foregoing descriptions are merely specific implementations of this application, but are not intended to limit the protection scope of this application. Any modification, equivalent replacement, or improvement made based on technical solutions of this application shall fall within the protection scope of this application.

What is claimed is:

1. A photovoltaic power generation system, comprising: at least one first photovoltaic module, a photovoltaic inverter, a first two-way direct current-direct current (DC/DC) converter, and at least one first energy storage unit, and further comprising at least one second photovoltaic module or at least one second energy storage unit, wherein the photovoltaic inverter comprises a DC/DC converter and a direct current-alternating current (DC-AC) inverter, wherein an input terminal of the DC/DC converter is electrically connected to an output terminal of the at least one first photovoltaic module, an output terminal of the DC/DC converter is connected to an input terminal of the DC-AC inverter through a direct current bus, and the photovoltaic inverter is configured to convert a direct current output by the first photovoltaic module into an alternating current and output the alternating current to a power grid; and the first two-way DC/DC converter comprises at least three ports, wherein a first port of the at least three ports of the first two-way DC/DC converter is electrically connected to the direct current bus, a second port of the at least three ports of the first two-way DC/DC converter is electrically connected to a port of the at least one first energy storage unit, a third port of the at least three ports of the first two-way DC/DC converter is electrically connected to an output terminal of the at least one second photovoltaic module or a port of the at least one second energy storage unit, and a circuit between any two ports of the first, second, and third ports of the first two-way DC/DC converter is configured with two-way circulation.

2. The photovoltaic power generation system according to claim 1, wherein the photovoltaic power generation system further comprises a second two-way DC/DC converter and at least one third energy storage unit, and the photovoltaic power generation system further comprises at least one third photovoltaic module or at least one fourth energy storage unit, wherein the second two-way DC/DC converter comprises at least three ports, wherein a first port of the at least three ports of the second two-way DC/DC converter is electrically connected to the direct current bus, a second port of the at least three ports of the second two-way DC/DC converter is electrically connected to a port of the at least one third energy storage unit, and a third port of the at least three ports of the second two-way DC/DC converter is electrically connected to an output terminal of the at least one third photovoltaic module or a port of the at least one fourth energy storage unit.

3. The photovoltaic power generation system according to claim 1, wherein
a circuit between the first port and the second port of the first two-way DC/DC converter is configured as a booster circuit, wherein the first port is a high-level port and the second port is a low-level port;
a circuit between the first port and the third port of the first two-way DC/DC converter is configured as a booster circuit, wherein the first port is a high-level port and the third port is a low-level port; and
a circuit between the second port and the third port of the first two-way DC/DC converter is configured as a buck-boost circuit.

4. The photovoltaic power generation system according to claim 1, wherein the second port of the first two-way DC/DC converter comprises at least two sub-ports that are electrically connected to output terminals of at least two second photovoltaic modules, and the at least two sub-ports are in a one-to-one correspondence with the at least two second photovoltaic modules.

5. The photovoltaic power generation system according to claim 1, wherein the photovoltaic power generation system further comprises a maximum power point tracking (MPPT) controller, configured to control a current direction in the first two-way DC/DC converter and a charge/discharge power of the first two-way DC/DC converter.

6. A photovoltaic power transmission method, the method comprising:

when an amount of power demanded by a power grid is less than an amount of power generated by at least one first photovoltaic module, configuring, by a maximum power point tracking (MPPT) controller, a current direction of a first two-way direct current-direct current (DC/DC) converter to be from a first port to a second port and from a third port to the second port of the first two-way direct DC/DC converter, wherein the power grid receives an alternating current from a photovoltaic power generation system, the photovoltaic power generation system, comprising:

the MPPT controller, the at least one first photovoltaic module, a photovoltaic inverter, the first two-way DC/DC converter, and at least one first energy storage unit, and further comprising at least one second photovoltaic module or at least one second energy storage unit, wherein the photovoltaic inverter comprises a DC/DC converter and a direct current-alternating current (DC-AC) inverter, wherein an input terminal of the DC/DC converter is electrically connected to an output terminal of the at least one first photovoltaic module, an output terminal of the DC/DC converter is connected to an input terminal of the DC-AC inverter through a direct current bus, and the photovoltaic inverter is configured to convert a direct current output by the first photovoltaic module into an alternating current and output the alternating current to the power grid; and the first two-way DC/DC converter comprises at least three ports, wherein the first port of the at least three ports of the first two-way DC/DC converter is electrically connected to the direct current bus, the second port of the at least three ports of the first two-way DC/DC converter is electrically connected to a port of the at least one first energy storage unit, the third port of the at least three ports of the first two-way DC/DC converter is electrically connected to an output terminal of the at least one second photovoltaic module or a port of the at least one second energy storage unit, and a circuit between any two ports of the first, second, and third ports of the first two-way DC/DC converter is configured with two-way circulation, wherein the second port of the first two-way DC/DC converter is electrically connected to the output terminal of the at least one second photovoltaic module; or when an amount of power demanded by the power grid equals an amount of power generated by the at least one first photovoltaic module, configuring, by the MPPT controller, the current direction of the first two-way DC/DC converter to be from the third port to the second port; or when an amount of power demanded by the power grid is greater than an amount of power generated by the at least one first photovoltaic module, configuring, by the MPPT controller, the current direction of the first two-way DC/DC converter to be from the third port to the first port and/or from the second port to the first port.

7. The photovoltaic power transmission method according to claim 6, wherein the, when an amount of power demanded by the power grid is greater than an amount of power generated by the at least one first photovoltaic module, configuring, by the MPPT controller, the current direction of the first two-way DC/DC converter to be from the third port to the first port and/or from the second port to the first port, comprises:

when the amount of power demanded by the power grid is greater than the amount of power generated by the at least one first photovoltaic module, and less than an amount of power generated by the at least one first photovoltaic module and the at least one second photovoltaic module, configuring, by the MPPT controller, the current direction of the first two-way DC/DC converter to be from the third port to the first port and from the third port to the second port; or when the amount of power demanded by the power grid equals an amount of power generated by the at least one first photovoltaic module and the at least one second photovoltaic module, configuring, by the MPPT controller, the current direction of the first two-way DC/DC converter to be from the third port to the first port; or when the amount of power demanded by the power grid is greater than an amount of power generated by the at least one first photovoltaic module and the at least one second photovoltaic module, configuring, by the MPPT controller, the current direction of the first two-way DC/DC converter to be from the third port to the first port and from the second port to the first port.

8. A photovoltaic power transmission method, the method comprising:

when an amount of power demanded by a power grid is less than an amount of power generated by at least one first photovoltaic module, configuring, by a maximum power point tracking (MPPT) controller, a current direction of a first two-way direct current-direct current (DC/DC) converter to be from a first port to a second port and/or from the first port to a third port of the first two-way direct DC/DC converter, wherein the power grid receives an alternating current from a photovoltaic power generation system, the photovoltaic power generation system, comprising:

the MPPT controller, the at least one first photovoltaic module, a photovoltaic inverter, the first two-way DC/DC converter, and at least one first energy storage unit, and further comprising at least one second photovoltaic module or at least one second energy storage unit, wherein the photovoltaic inverter comprises a DC/DC converter and a direct current-alternating current (DC-AC) inverter, wherein an input terminal of the DC/DC converter is electrically connected to an output terminal of the at least one first photovoltaic module, an output terminal of the DC/DC converter is connected to an input terminal of the DC-AC inverter through a direct current bus, and the photovoltaic inverter is configured to convert a direct current output by the first photovoltaic module into an alternating current and output the alternating current to the power grid; and the first two-way DC/DC converter comprises at least three ports, wherein the first port of the at least three ports of the first two-way DC/DC converter is electrically connected to the direct current bus, the second port of the at least three ports of the first two-way DC/DC converter is electrically connected to a port of the at least one first energy storage unit, the third port of the at least three ports of the first two-way DC/DC converter is electrically connected to an output terminal of the at least one second photovoltaic module or a port of the at least one second energy storage unit, and a circuit between any two ports of the first, second, and third ports of the first two-way DC/DC converter is configured with two-way circulation, wherein the second port of the first two-way DC/DC converter is electrically connected to the port of the at least one second energy storage unit; or when an amount of power demanded by the power grid is greater than an amount of power generated by the at least one first photovoltaic module, configuring, by the MPPT controller, the current direction of the first two-way DC/DC converter to be from the second port to the first port and/or from the third port to the first port.

* * * * *